United States Patent
Oikawa

(10) Patent No.: US 11,682,361 B2
(45) Date of Patent: Jun. 20, 2023

(54) LIQUID CRYSTAL DEVICE AND ELECTRONIC APPARATUS HAVING ELECTRODE BETWEEN PIXEL AREA AND SEAL MATERIAL

(71) Applicant: SEIKO EPSON CORPORATION, Tokyo (JP)

(72) Inventor: Hiroyuki Oikawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/746,994

(22) Filed: May 18, 2022

(65) Prior Publication Data
US 2022/0375421 A1 Nov. 24, 2022

(30) Foreign Application Priority Data
May 19, 2021 (JP) .............................. JP2021-084497

(51) Int. Cl.
*G09G 3/36* (2006.01)
*G02F 1/1339* (2006.01)
(Continued)

(52) U.S. Cl.
CPC ......... *G09G 3/3614* (2013.01); *G02F 1/1339* (2013.01); *G02F 1/133719* (2013.01); *G02F 1/133757* (2021.01); *G02F 1/134336* (2013.01); *G09G 3/3648* (2013.01); *G09G 2300/0413* (2013.01); *G09G 2320/0257* (2013.01)

(58) Field of Classification Search
CPC ............... G09G 3/3614; G09G 3/3648; G09G 2300/0413; G02F 1/133719; G02F 1/133757; G02F 1/1339; G02F 1/134336
See application file for complete search history.

(56) References Cited

U.S. PATENT DOCUMENTS

| 2012/0092602 A1* | 4/2012 | Akagawa | G02F 1/133719 349/125 |
| 2013/0050146 A1* | 2/2013 | Saitoh | G06F 1/3265 345/173 |

(Continued)

FOREIGN PATENT DOCUMENTS

| JP | 2007-025530 | 2/2007 |
| JP | 2017-116954 | 6/2017 |

(Continued)

*Primary Examiner* — Sanghyuk Park
(74) *Attorney, Agent, or Firm* — JCIPRNET

(57) ABSTRACT

In a liquid crystal device, an electrode is provided between a pixel area of a first substrate and a seal material, and an AC signal is applied to the electrode where a potential with respect to a common potential applied to a common electrode as a reference potential is alternately switched between a positive polarity and a negative polarity. For the AC signal, a length of a positive polarity period where a polarity becomes positive with respect to the common potential and a length of a negative polarity period where a polarity becomes negative with respect to the common potential are different. When anionic impurities of a liquid crystal layer are focused, a positive polarity period length is greater than a negative polarity period length. When cationic impurities of the liquid crystal layer are focused, a negative polarity period length is greater than a positive polarity period length.

8 Claims, 12 Drawing Sheets

(51) Int. Cl.
*G02F 1/1343* (2006.01)
*G02F 1/1337* (2006.01)

(56) References Cited

U.S. PATENT DOCUMENTS

| | | | | |
|---|---|---|---|---|
| 2013/0128210 A1* | 5/2013 | Nagasawa | ........... | G02F 1/13452 |
| | | | | 349/151 |
| 2014/0368481 A1* | 12/2014 | Tomikawa | ............ | G02F 1/1339 |
| | | | | 345/96 |
| 2016/0253973 A1* | 9/2016 | Nishida | ................ | G09G 3/3655 |
| | | | | 345/209 |
| 2019/0355319 A1 | 11/2019 | Yatabe et al. | | |

FOREIGN PATENT DOCUMENTS

| JP | 2018-180428 | 11/2018 |
|---|---|---|
| JP | 2020-042293 | 3/2020 |
| JP | 2020-201398 | 12/2020 |

* cited by examiner

LIQUID CRYSTAL DEVICE AND ELECTRONIC APPARATUS HAVING ELECTRODE BETWEEN PIXEL AREA AND SEAL MATERIAL

The present application is based on, and claims priority from JP Application Serial Number 2021-084497, filed May 19, 2021, the disclosure of which is hereby incorporated by reference herein in its entirety.

BACKGROUND

1. Technical Field

The present disclosure relates to a liquid crystal device and an electronic apparatus.

2. Related Art

A liquid crystal device used in a projection-type display device or the like includes a first substrate, a second substrate bonded to the first substrate via a seal material, and a liquid crystal layer is disposed inside the seal material. In such a liquid crystal device, when ionic impurities of the liquid crystal layer are unevenly distributed within a pixel area, light modulation characteristics are deteriorated in the area where the ionic impurities are unevenly distributed. Therefore, there has been proposed a technique of providing an electrode in a peripheral area between a pixel area of a first substrate and a seal material, and applying fixed potential to the electrode to sweep out ionic impurities from the pixel area toward the electrode. (See JP 2018-180428 A).

In the technique described in JP 2018-180428 A, since the fixed potential is applied to the electrode, when an ionic layer is formed by the ionic impurities adsorbed on the electrodes, as a result of the potential of the electrode being shielded, it is not possible to sweep out the ionic impurities from the pixel area to the peripheral area thereafter. Therefore, in the technique described in JP 2018-180428 A, there is a problem that it is not possible to sufficiently prevent ionic impurities from being unevenly distributed in the pixel area in the liquid crystal device.

SUMMARY

In order to solve the problem described above, an aspect of a liquid crystal device according to the present disclosure includes a first substrate having a pixel electrode in a pixel area, a second substrate having a common electrode to which a common potential is applied, a seal material provided between the first substrate and the second substrate, and a liquid crystal layer disposed in a space surrounded by the seal material, wherein the first substrate has an electrode between the pixel area and the seal material in plan view, and the electrode is applied with an AC signal in which a length of a positive polarity period in which a polarity becomes positive with respect to the common potential and a length of a negative polarity period in which a polarity becomes negative with respect to the common potential are different.

An aspect of an electronic apparatus according to the present disclosure includes a first liquid crystal device on which light in a first wavelength range is incident, a second liquid crystal device on which light in a second wavelength range having a longer wavelength than that of the first wavelength range is incident, and a third liquid crystal device on which light in a third wavelength range having a longer wavelength than that of the second wavelength range is incident, and a synthetic optical system configured to synthesize light in the first wavelength range emitted from the first liquid crystal device, light in the second wavelength range emitted from the second liquid crystal device, and light in the third wavelength range emitted from the third liquid crystal device, wherein a liquid crystal device to which the present disclosure is applied is used for the first liquid crystal device.

Another aspect of the electronic apparatus according to the present disclosure includes a first liquid crystal device on which light in a first wavelength range is incident, a second liquid crystal device on which light in a second wavelength range having a longer wavelength than that of the first wavelength range is incident, and a third liquid crystal device on which light in a third wavelength range having a longer wavelength than that of the second wavelength range is incident, and a synthetic optical system configured to synthesize light in the first wavelength range emitted from the first liquid crystal device, light in the second wavelength range emitted from the second liquid crystal device, and light in the third wavelength range emitted from the third liquid crystal device, wherein a liquid crystal device to which the present disclosure is applied is used for each of the first liquid crystal device and the second liquid crystal device.

DESCRIPTION OF EXEMPLARY EMBODIMENTS

Figure 1:
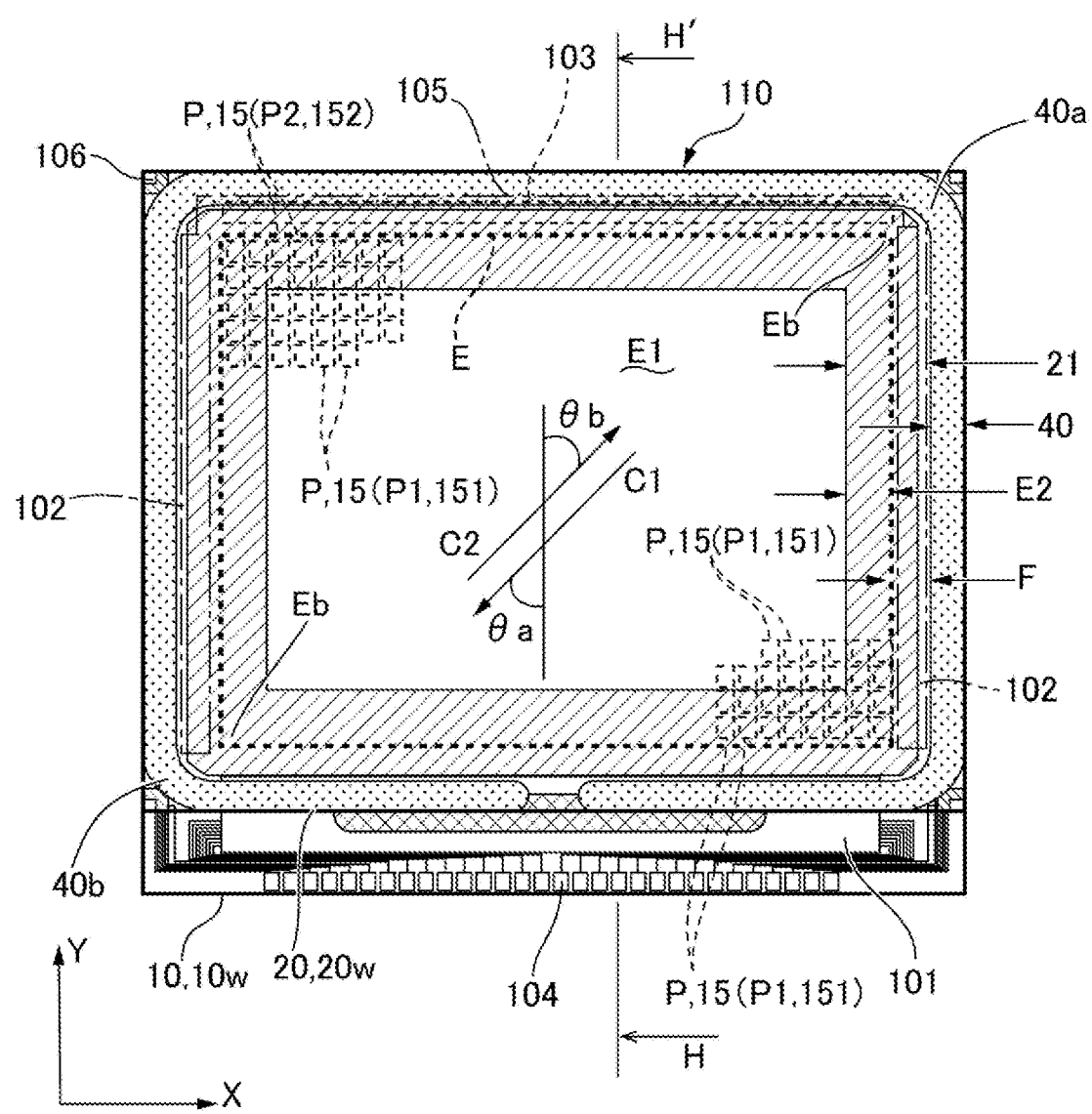
FIG. 1 is an explanatory diagram illustrating a plan view configuration of a liquid crystal device according to Exemplary Embodiment 1 of the present disclosure.

Exemplary embodiments of the present disclosure will be described below with reference to the accompanying drawings. Note that, in the drawings referred to below, parts described are illustrated in an enlarged or reduced state as appropriate, so that those parts can be easily recognized. Further, in the description below, when describing films or the like formed at a first substrate 10, an upper layer refers to a side opposite to a substrate body 10w of the first substrate 10, and a lower layer refers to a side of the substrate body 10w. When describing films or the like formed at a second substrate 20, an upper layer refers to a side opposite to a substrate body 20w of the second substrate 20, and a lower layer refers to a side of the substrate body 20w. Further, plan view means a state as viewed from a normal direction with respect to the first substrate 10 and the second substrate 20. Furthermore, in the description below, as an example of a transistor, the active matrix type liquid crystal device 110, which is provided with a thin film transistor (TFT) 30 as a pixel switching element, will be mainly described. Such a liquid crystal device 110 can be suitably used as a light valve of a projection-type display device, which will be described below, or the like.

1. First Exemplary Embodiment 1-1. Overall Configuration of Liquid Crystal Device 110

Figure 2:
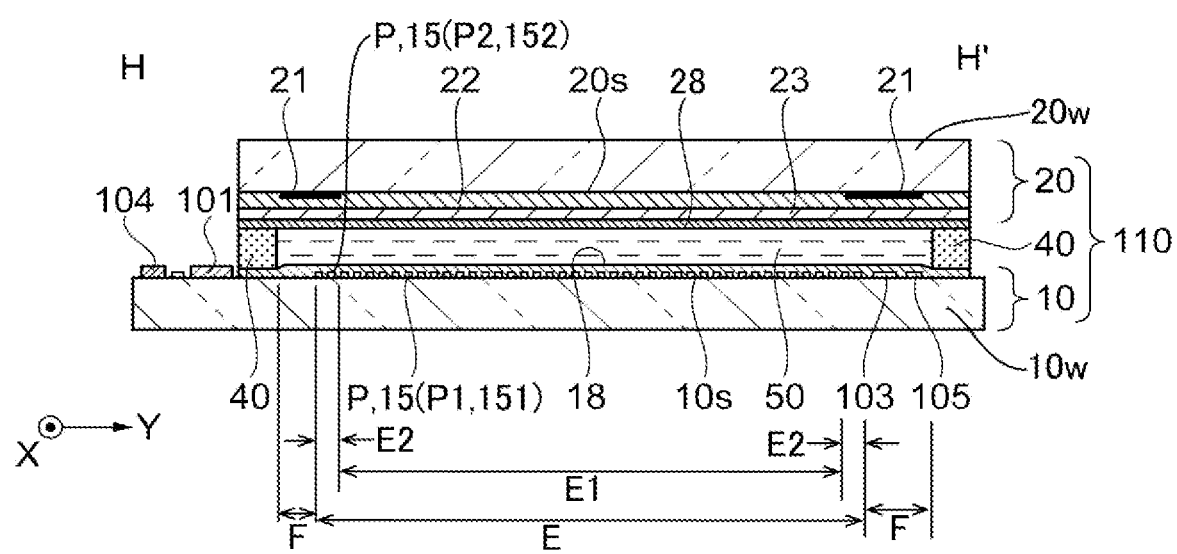
FIG. 2 is a cross-sectional view schematically illustrating an H-H' cross section of the liquid crystal device illustrated in FIG. 1.

FIG. 1 is an explanatory diagram illustrating a plan view configuration of the liquid crystal device 110 according to Exemplary Embodiment 1 of the present disclosure. FIG. 2 is a cross-sectional view schematically illustrating an H-H' cross section of the liquid crystal device 110 illustrated in FIG. 1.

The liquid crystal device 110 illustrated in FIGS. 1 and 2 is mounted in a direct-view type or projection-type display device along with an optical element or the like. The liquid crystal device 110 includes the first substrate 10, and the second substrate 20 facing the first substrate 10, and the first substrate 10 and the second substrate 20 are bonded together via a frame-shaped seal material 40. Between the first substrate 10 and the second substrate 20, a liquid crystal layer 50 is disposed in a space surrounded by the seal material 40. The first substrate 10 includes the substrate body 10w formed of a transmissive substrate such as a quartz substrate or a glass substrate, and the substrate body 10w to a first alignment film 18 correspond to the first substrate 10. The second substrate 20 includes the substrate body 20w formed of a transmissive substrate such as a quartz substrate or a glass substrate, and the substrate body 20w to a second alignment film 28 correspond to the second substrate 20.

The first substrate 10 is larger than the second substrate 20, and the seal material 40 is disposed along an outer edge of the second substrate 20. The liquid crystal layer 50 is formed by a liquid crystal material having positive or negative dielectric anisotropy. The seal material 40 is formed from an adhesive such as a thermosetting or ultraviolet-curable epoxy resin, and includes a spacer (not illustrated) for maintaining a constant spacing between the first substrate 10 and the second substrate 20.

A pixel area E is provided in an area surrounded by the seal material 40, and a plurality of pixels P are arrayed in a matrix manner in the pixel area E. The second substrate 20 is provided with a partition portion 21 provided in a peripheral area F between the seal material 40 and the pixel area E to surround a periphery of the pixel area E. The partition portion 21 is configured by a light shielding layer made from metal, metal oxide, or the like. The light-shielding layer may be configured as a black matrix that overlaps with boundary portions of the adjacent pixels P in plan view, with respect to the second substrate 20.

On a side of a one surface 10s of the first substrate 10, which faces the second substrate 20 of the substrate body 10w, a plurality of terminals 104 are arrayed along one side outside the seal material 40, and a data line driving circuit 101 is provided between the terminals 104 and the pixel area E. On the side of the one surface 10s of the substrate body 10w, a scanning line driving circuit 102 is provided outside the pixel area E along each of two sides adjacent to a side on which the terminals 104 are arrayed, and an inspection circuit 103 and a wiring line 105 are provided along a side opposite to the side on which the terminals 104 are arrayed. The data line driving circuit 101 and each of the plurality of wiring lines coupled to the scanning line driving circuits 102 are coupled to the plurality of terminals 104. Hereinafter, a direction in which the terminals 104 are arrayed is referred to as an X-axis direction, and a direction orthogonal to the X-axis direction is referred as a Y-axis direction.

A pixel electrode 15 disposed for each of the plurality of pixels P and the first alignment film 18 covering the pixel electrodes 15 are provided on the one surface 10s side of the substrate body 10w. In addition, although not illustrated, a pixel switching element, wiring lines, and the like, which will be described below, are provided on the one surface 10s side of the first substrate 10. The pixel electrode 15 is formed from a light-transmissive conductive film, such as indium tin oxide (ITO).

The partition portion 21, a flattening film 22 covering the partition portion 21, a common electrode 23 covering the flattening film 22, and the second alignment film 28 covering the common electrode 23 are provided on the one surface 20s side of the second substrate 20 that faces the first substrate 10 of the substrate body 20w. The partition portion 21 overlaps with the scanning line driving circuit 102 and the inspection circuit 103 in plan view. Therefore, an erroneous operation due to light is prevented by shielding light that may be incident on the scanning line driving circuit 102 and the like from the second substrate 20 side. In addition, the partition portion 21 prevents unwanted stray light from being incident on the pixel area E to suppress deterioration of contrast of a displayed image. The flattening film 22 is formed from an inorganic material, such as silicon oxide, for example. The common electrode 23 is formed of ITO or the like, and is electrically coupled to the terminal 104 via a vertical conduction portion 106 provided between the first substrate 10 and the second substrate 20, and wiring provided at the first substrate 10.

The first alignment film 18 and the second alignment film 28 are selected based on an optical design of the liquid crystal device 110. The first alignment film 18 and the second alignment film 28 are each formed of an inorganic alignment film including an inorganic material, such as silicon oxide (SiOx) formed by a vapor-phase growth method such as vapor deposition. In this case, the first alignment film 18 and the second alignment film 28 align liquid crystal molecules having negative dielectric anisotropy to be substantially vertical. The first alignment film 18 and the second alignment film 28 may be formed of an organic alignment film, such as polyimide having a surface that has been rubbed. In this case, the organic alignment film aligns liquid crystal molecules having positive dielectric anisotropy to be substantially horizontal.

The liquid crystal device 110 configured in this way is of a transmissive type. Thus, the liquid crystal device 110 is configured as a liquid crystal device in a normally-white mode in which transmittance of the pixel P is maximized in a voltage not applied state or in a normally-black mode in which the transmittance of the pixel P is minimum in a voltage not applied state, depending on an optical design of each of polarization elements disposed on a light incident side and a light-emitting side with respect to the liquid crystal panel 110. In the following description, an example is described in which the optical design of the normally-black mode is applied, using inorganic alignment films as the first alignment film 18 and the second alignment film 28, and using a liquid crystal material having negative dielectric anisotropy for the liquid crystal layer 50.

1-2. Electrical Configuration of Liquid Crystal Device 110

Figure 3:
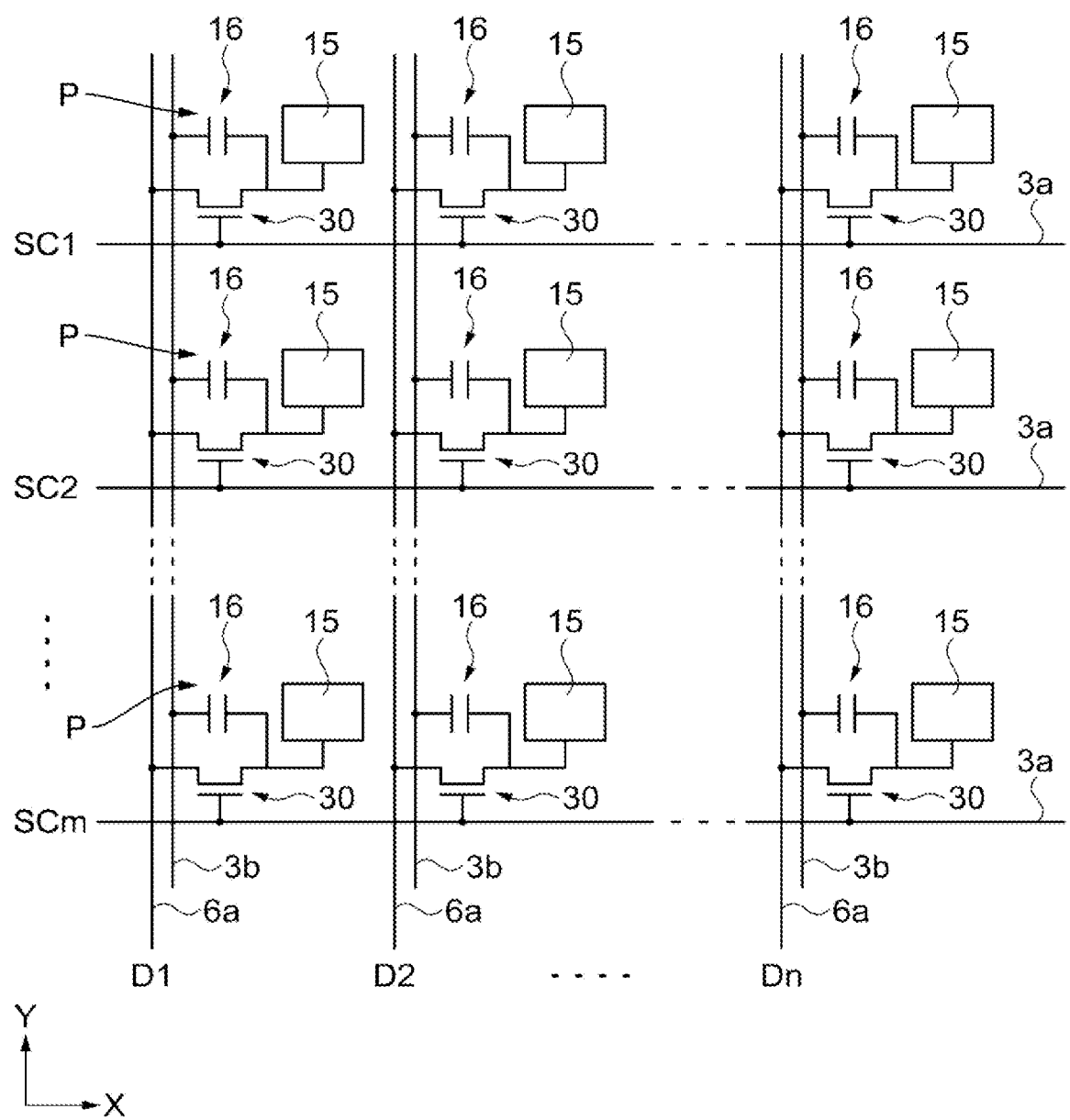
FIG. 3 is an equivalent circuit diagram illustrating an electrical configuration of the liquid crystal device illustrated in FIG. 1.

FIG. 3 is an equivalent circuit diagram illustrating an electrical configuration of the liquid crystal device 110 illustrated in FIG. 1. As illustrated in FIG. 3, the liquid crystal device 110 includes at least a plurality of scanning lines 3a extending in the X-axis direction in the pixel area E, and a plurality of data lines 6a extending in the Y-axis direction. The scanning line 3a and the data line 6a are in an insulated state from each other in the first substrate 10. The first substrate 10 includes capacitor lines 3b that extend along the data lines 6a. In addition, the pixel P is provided to correspond to each of intersections between the plurality of scanning lines 3a and the plurality of data lines 6a. Each of the plurality of pixels P includes the pixel electrode 15, the TFT 30, and a storage capacitor 16. The scanning line 3a is electrically coupled to a gate of the TFT 30, and the data line 6a is electrically coupled to a source of the TFT 30. The pixel electrode 15 is electrically coupled to a drain of the TFT 30.

The data lines 6a are coupled to the data line driving circuit 101 illustrated in FIG. 1, and supply image signals D1, D2, . . . , and Dn supplied from the data line driving circuit 101 to each of the pixels P. The scanning lines 3a are coupled to the scanning line driving circuit 102 illustrated in FIG. 1, and sequentially supply scanning signals SC1, SC2, . . . , and SCm supplied from the scanning line driving circuit 102 to each of the pixels P. The image signals D1 to Dn supplied from the data line driving circuit 101 to the data lines 6a may be line-sequentially supplied in this order, or may be supplied to the plurality of data lines 6a adjacent to one another per group. The scanning line driving circuit 102 line-sequentially supplies the scan signals SC1 to SCm to the scanning lines 3a, at predetermined timings.

In the liquid crystal device 110, during a period in which the TFT 30, which is a switching element, is turned on by an input of the scanning signals SC1 to SCm, the image signals D1 to Dn supplied from the data lines 6a are written into the pixel electrodes 15 at predetermined timings. The image signals D1 to Dn of a predetermined level written into the liquid crystal layer 50 via the pixel electrodes 15 are maintained for a certain period between the pixel electrodes 15 and the common electrode 23, which are arranged to face the pixel electrodes 15 being intervened by the liquid crystal layer 50. The frequency of the image signals D1 to Dn is 60 Hz, for example. In the present exemplary embodiment, to inhibit the image signals D1 to Dn maintained between the pixel electrodes 15 and the liquid crystal layer 50 from leaking, the storage capacitor 16 is coupled in parallel with a liquid crystal capacitor formed between the pixel electrode 15 and the common electrode 23. The storage capacitor 16 is provided between the drain of the TFT 30 and the capacitor line 3b.

The data lines 6a are coupled to the inspection circuit 103 illustrated in FIG. 1, and the inspection circuit 103 is used to verify operational defects and the like of the liquid crystal device 110 by detecting the above-described image signals D1 to Dn in a manufacturing process of the liquid crystal device 110. Note that in FIG. 1, the data line driving circuit 101, the scanning line driving circuit 102, and the inspection circuit 103 are illustrated as peripheral circuits formed on the outer side of the pixel area E. However, a sampling circuit that is configured to sample the above-described image signals and supply the sampled image signals to the data lines 6a, a pre-charge circuit that is configured to supply pre-charge signals of a predetermined voltage level to the data lines 6a in advance of the above-described image signals D1 to Dn, and the like may be provided as the peripheral circuits in some cases.

1-3. Configuration of Pixel P

Figure 4:
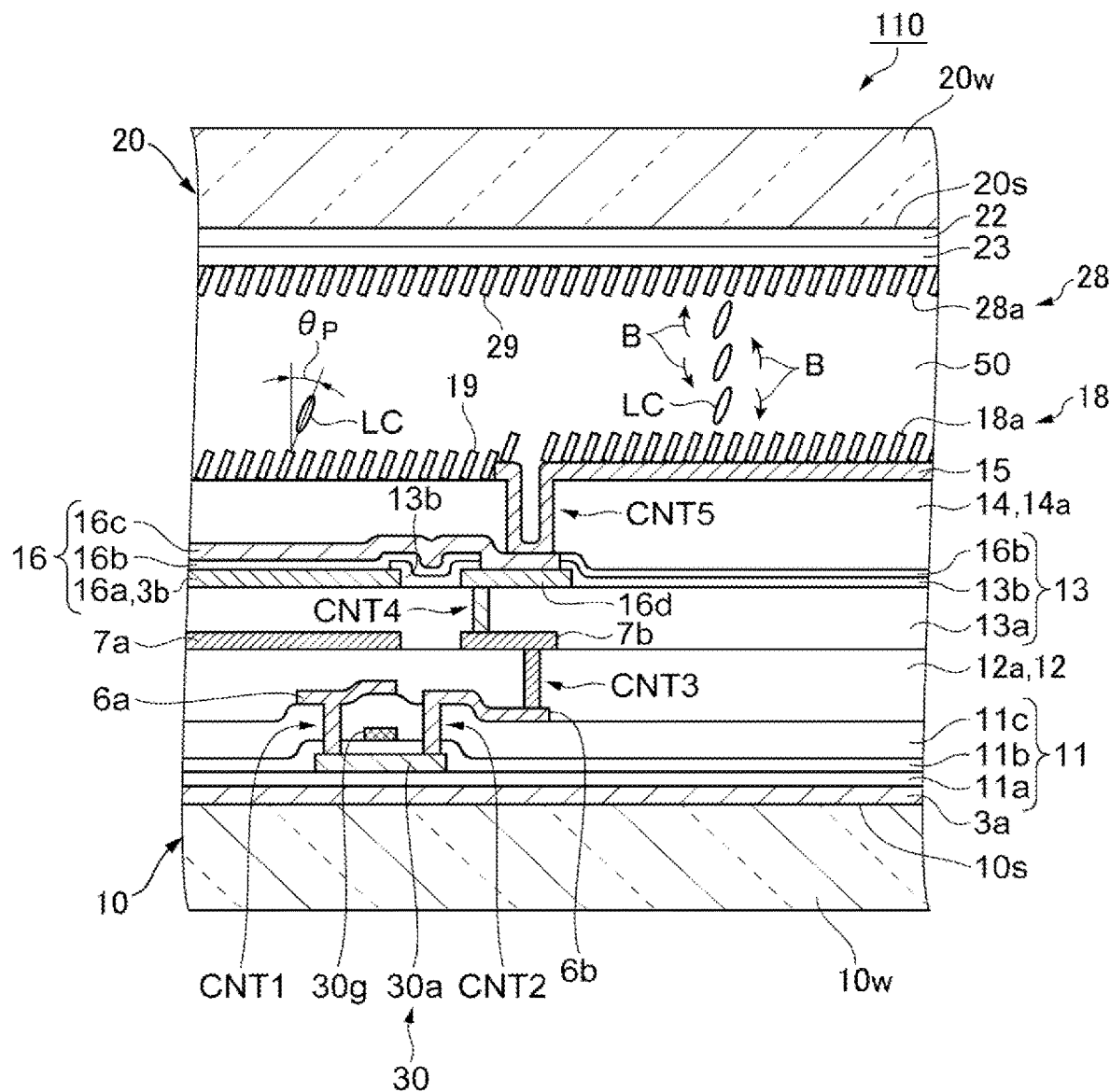
FIG. 4 is a cross-sectional view schematically illustrating structure of a pixel illustrated in FIG. 3.

FIG. 4 is a cross-sectional view schematically illustrating a structure of the pixel P illustrated in FIG. 3. As illustrated in FIG. 4, the scanning line 3a is formed at the one surface 10s of the substrate body 10w of the first substrate 10. The scanning line 3a is formed by a light shielding layer such as aluminum, titanium, chromium, tungsten, tantalum, molybdenum, or the like.

A first insulating film 11a made of silicon oxide or the like is formed at the upper layer of the scanning line 3a, and a semiconductor layer 30a is formed at an upper layer of the first insulating film 11a. The semiconductor layer 30a is formed by a polycrystalline silicon film. The semiconductor layer 30a is covered with a second insulating film 11b made of silicon oxide or the like, and a gate electrode 30g electrically coupled to the scanning line 3a is formed at an upper layer of the second insulating film 1ib.

A third insulating film 11c made of silicon oxide or the like is formed at an upper layer of the gate electrode 30g. In the second insulating film 11b and the third insulating film 11c, contact holes CNT1 and CNT2 extending to a source area and a drain area of the semiconductor layer 30a are formed. The data line 6a coupled to the semiconductor layer 30a through the contact holes CNT1 and CNT2, and a first relay electrode 6b are formed at an upper layer of the third insulating film 11c. The TFT 30 is configured in this manner. In the present exemplary embodiment, the TFT 30 has a lightly doped drain (LDD) structure.

A first interlayer insulating film 12a formed of silicon oxide or the like is formed on an upper layer side of the data line 6a and the first relay electrode 6b. A surface of the first interlayer insulating film 12a is flattened by chemical mechanical polishing (CMP) processing or the like. A contact hole CNT3 extending to the first relay electrode 6b is formed in the first interlayer insulating film 12a, and a wiring line 7a and a second relay electrode 7b electrically coupled to the first relay electrode 6b through the contact hole CNT3 are formed at an upper layer of the first interlayer insulating film 12a. The wiring line 7a is formed to overlap with the semiconductor layer 30a of the TFT 30 and the data line 6a in plan view, and functions as a shield layer to which fixed potential is applied.

A second interlayer insulating film 13a formed of silicon oxide or the like is formed on an upper layer side of the wiring line 7a and the second relay electrode 7b. A surface of the second interlayer insulating film 13a is flattened by the CMP processing or the like. A contact hole CNT4 extending to the second relay electrode 7b is formed in the second interlayer insulating film 13a.

Using a light shielding metal or the like, a first capacitor electrode 16a and a third relay electrode 16d are formed at upper layer of the second interlayer insulating film 13a. The first capacitor electrode 16a is the capacitor line 3b formed to extend across the plurality of pixels P, and fixed potential is supplied to the first capacitor electrode 16a. An insulating film 13b is formed at an upper layer of the first capacitor electrode 16a and the third relay electrode 16d, to cover an outer edge of the first capacitor electrode 16a, an outer edge of the third relay electrode 16d, and the like. A dielectric layer 16b is formed on an upper layer side of the first capacitor electrode 16a and the insulating film 13b. The dielectric layer 16b is formed by a silicon nitride film, hafnium oxide, alumina, tantalum oxide, or the like. A second capacitor electrode 16c formed of titanium nitride or the like is formed at an upper layer of the dielectric layer 16b, and the storage capacitor 16 is configured by the first capacitor electrode 16a, the dielectric layer 16b, and the second capacitor electrode 16c. The second capacitor electrode 16c is electrically coupled to the third relay electrode 16d through a removed portion of the dielectric layer 16b and the insulating film 13b.

A fourth interlayer insulating film 14a formed of silicon oxide or the like is formed on an upper layer side of the second capacitor electrode 16c, and a surface of the fourth interlayer insulating film 14a is flattened by the CMP processing or the like. A contact hole CNT5 extending to the second capacitor electrode 16c is formed in the fourth interlayer insulating film 14a. The pixel electrodes 15 formed by a light-transmissive conductive film such as ITO are formed at upper layer of the fourth interlayer insulating film 14a, and the pixel electrodes 15 are electrically coupled to the second capacitor electrode 16c through the contact hole CNT5.

In the liquid crystal device 110 configured in this manner, a plurality of wiring lines are formed at the first substrate 10, and a wiring portion is indicated using reference signs of the insulating films and the interlayer insulating films that perform insulation between the wiring lines. For example, a representative wiring line of a wiring portion 11 is the scanning line 3a. A representative wiring line of a wiring portion 12 is the data line 6a. A representative wiring line of a wiring portion 13 is the wiring line 7a. A representative wiring line of a wiring portion 14 is the capacitor line 3b as the first capacitor electrode 16a.

1-4. Configuration of Liquid Crystal Layer 50 and the Like

The first alignment film 18 and the second alignment film 28 are the inorganic alignment films, and are respectively formed of aggregates of pillared columns 18a and 28a, which are each obtained by diagonally depositing and growing an inorganic material such as silicon oxide in a columnar shape. Thus, in the liquid crystal layer 50, liquid crystal molecules LC have a pre-tilt angle θp of 3° to 5° with respect to the normal direction with respect to the first substrate 10 and the second substrate 20, and are substantially aligned vertically (VA: Vertical Alignment). When a driving signal is applied between the pixel electrodes 15 and the common electrode 23, an inclination of the liquid crystal molecules LC changes in accordance with an electric field direction generated between the pixel electrodes 15 and the common electrode 23.

In FIG. 1, a diagonal deposition direction applied when forming the first alignment film 18 at the first substrate 10 is, for example, a direction indicated by an arrow C1, and is a direction that forms an angle θa in the Y-axis direction. A diagonal deposition direction applied when forming the second alignment film 28 at the second substrate 20 is, for example, a direction indicated by an arrow C2, and is a direction that forms an angle θb in the Y-axis direction. An alignment direction of the liquid crystal molecules LC is defined by such a deposition direction. The angle θa or θb is 45 degrees, for example. The diagonal deposition direction applied when forming the first alignment film 18 at the first substrate 10 is opposite to the diagonal deposition direction applied when forming the second alignment film 28 at the second substrate 20.

1-5. Description of Pixel Area E and the Like

Figure 5:
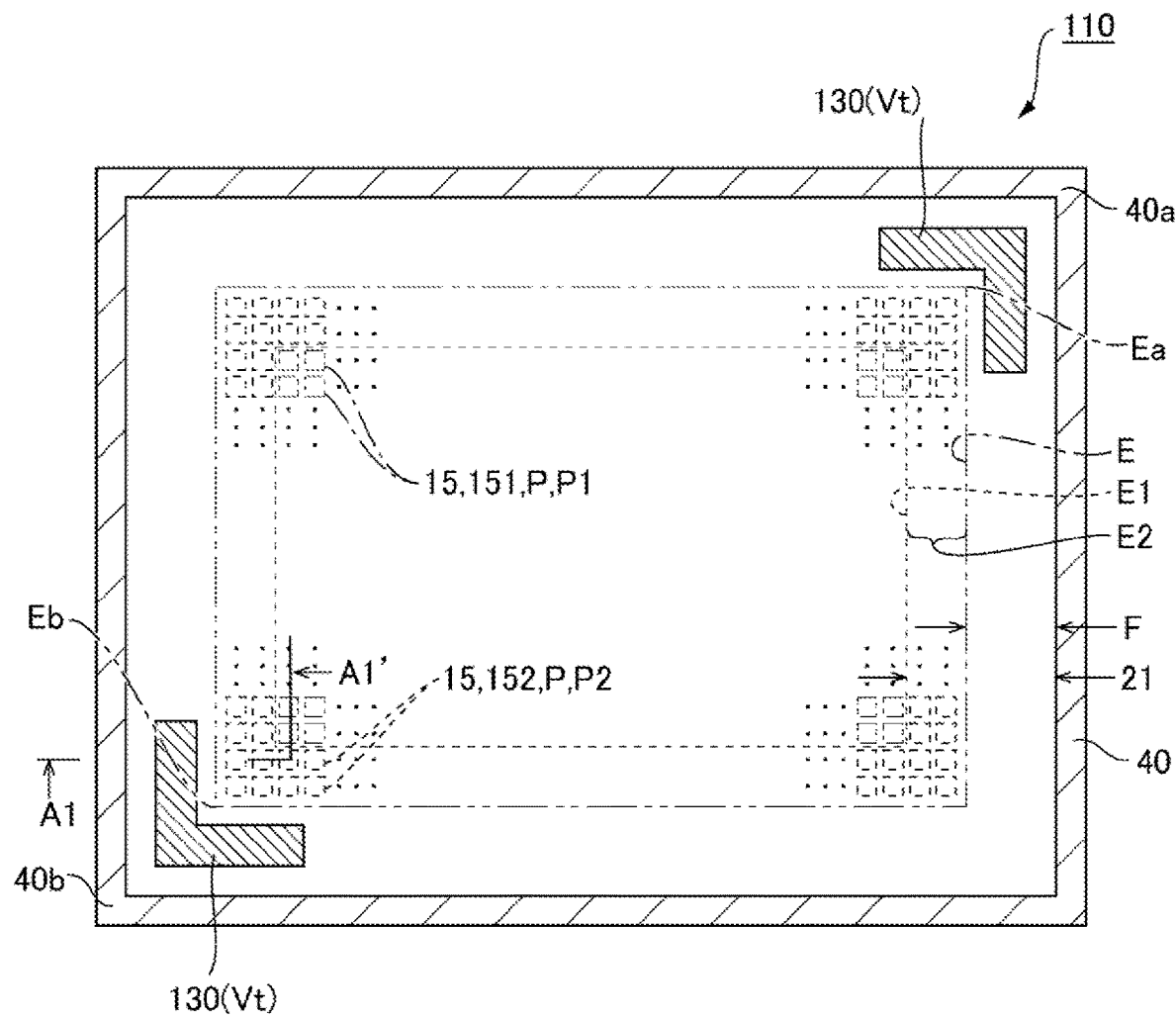
FIG. 5 is an explanatory diagram illustrating each area of the liquid crystal device illustrated in FIG. 1.
Figure 6:
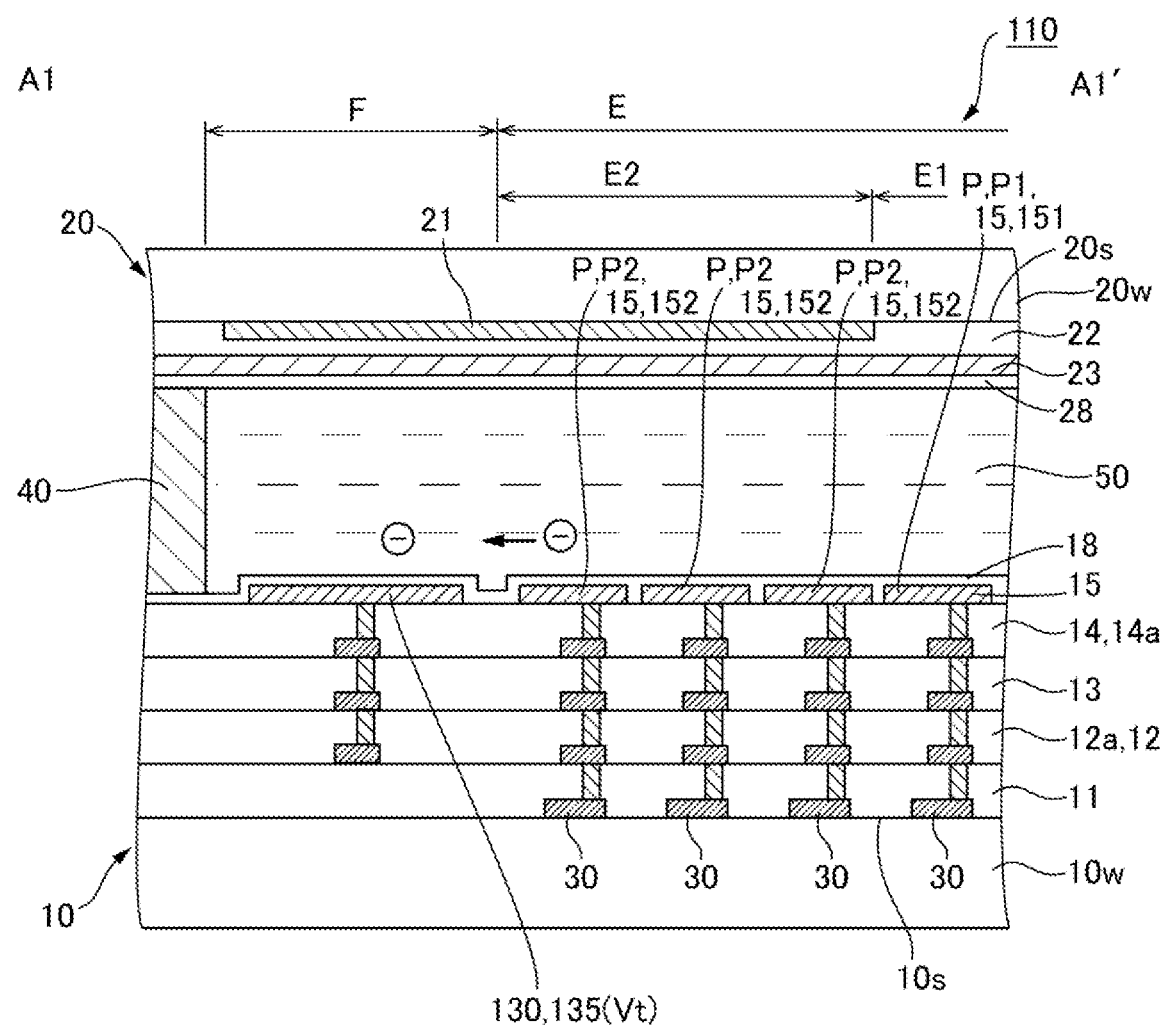
FIG. 6 is an explanatory diagram schematically illustrating an A1-A1' cross section of a liquid crystal device 110 illustrated in FIG. 5.

FIG. 5 is an explanatory diagram illustrating each area of the liquid crystal device 110 illustrated in FIG. 1, and is an explanatory diagram of an area where the first substrate 10 and the second substrate 20 overlap. FIG. 6 is an explanatory diagram schematically illustrating the A1-A1' cross section of the liquid crystal device 110 illustrated in FIG. 5. As illustrated in FIG. 5 and FIG. 6, the plurality of pixels P are disposed in the X-axis direction and the Y-axis direction in the pixel area E of the liquid crystal device 110, and each of the plurality of pixels P includes the pixel electrode 15 electrically coupled to the TFT 30. The pixel P and the pixel electrode 15 have the same planar shape, size, arrangement pitch, and the like.

The pixel area E includes a display area E1 in which, of the plurality of pixels P, display pixels P1 that directly contribute to display an image are disposed, and, around the display area E1, a dummy pixel area E2 that includes a plurality of dummy pixels P2 that do not directly contribute to display and image. In the following description, of the plurality of pixel electrodes 15, the pixel electrode 15 provided in the display pixel P1 is defined as a first pixel electrode 151 referred to as an effective pixel electrode or the like, and the pixel electrode 15 provided in the dummy pixel P2 is defined as a second pixel electrode 152 referred to as a dummy pixel electrode or the like. In an aspect illustrated in FIG. 5, pairs of two dummy pixels P2 are disposed in the dummy pixel area E2, respectively, with the display area E1 interposed therebetween in the X-axis direction, and pairs of two dummy pixels P2 are disposed, respectively, with the display area E1 interposed therebetween in the Y-axis direction. However, the number of dummy pixels P2 disposed in the dummy pixel area E2 is not limited to this example, and an aspect may be adopted in which at least one pair of the dummy pixels P2, or one pair of the three or more dummy pixels P2 are disposed, respectively, in each of the X-axis direction and the Y-axis direction with the display area E1 interposed therebetween.

In the present exemplary embodiment, since the liquid crystal device 110 is in the normally black mode, regardless of a display state in the display pixel P1, the second pixel electrode 152 is applied with fixed potential or AC potential that displays black in the dummy pixel P2. In the exemplary embodiment, the partition portion 21 is formed in an area that overlaps with the peripheral area F and the dummy pixel area E2 in plan view so that the dummy pixel P2 is not visible. Note that, the partition portion 21 overlaps in plan view with the peripheral area F, but may be disposed so as not to overlap in plan view with the dummy pixel area E2, and in this case, the dummy pixel area E2 functions as an electronic partition that constitutes a partition along with the partition portion 21.

1-6. Countermeasures Against Ionic Impurities

Figure 7:
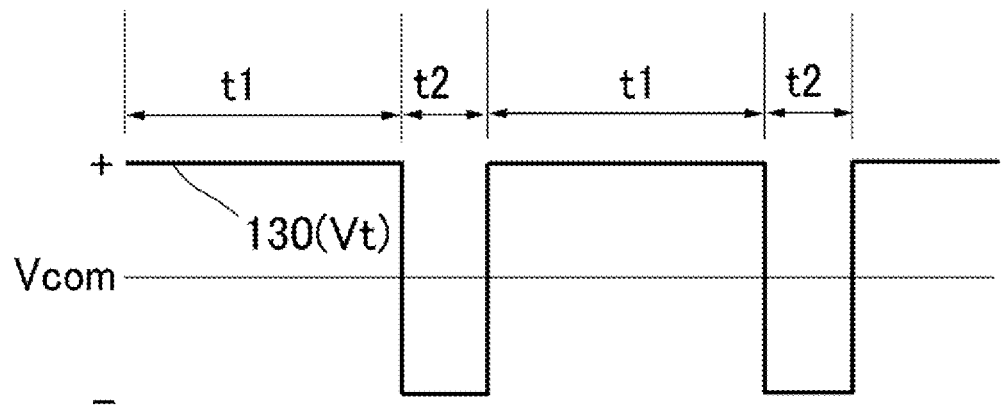
FIG. 7 is an explanatory diagram of an AC signal applied to an electrode illustrated in FIG. 6.

FIG. 7 is an explanatory diagram of an AC signal Vt applied to an electrode 130 illustrated in FIG. 6. In the liquid crystal device 110 described with reference to FIG. 1 and the like, when the liquid crystal layer 50 is driven by supplying an image signal to the pixel electrode 15, the liquid crystal molecules LC vibrate, as indicated by arrows B in FIG. 4, and a flow of the liquid crystal molecules LC occurs in the diagonal deposition directions indicated by the arrows C1 and C2 illustrated in FIG. 1. Therefore, when ionic impurities are included in the liquid crystal layer 50 due to contamination during liquid crystal injection, elution from the seal material 40, or the like, the ionic impurities move toward corners Ea and Eb of the pixel area E along the flow of the liquid crystal molecules LC, and are to be unevenly distributed.

Thus, in the present exemplary embodiment, as illustrated in FIGS. 5 and 6, the electrode 130 is provided in the peripheral area F between the seal material 40 and the pixel area E in the first substrate 10, and the electrode 130 faces the common electrode 23 via the liquid crystal layer 50. The electrode 130 is provided at least between the corner of the pixel area E where the ionic impurities are to be unevenly distributed, and corners of the seal material 40. In the present exemplary embodiment, corresponding to the diagonal deposition direction indicated by the arrows C1 and C2 illustrated in FIG. 1, the electrode 130 is provided at least between the two corners Ea and Eb in the diagonal direction of the pixel area E, and the two corners 40a and 40b in the diagonal direction of the seal material 40, respectively.

As illustrated in FIG. 7, the AC signal Vt is applied to the electrode 130 in which potential alternates between a positive polarity and a negative polarity when a common potential Vcom applied to the common electrode 23 is used as reference potential. In the present exemplary embodiment, the AC signal Vt varies by identical potential on a high potential side and a low potential side, with the common potential Vcom as a center. Here, for the AC signal Vt, a length t1 of a positive polarity period t1 in which a polarity becomes positive with respect to the common potential Vcom and a length t2 of a negative polarity period t2 in which a polarity becomes negative with respect to the common potential Vcom are different. The length t1 of the positive polarity period and the length t2 of the negative polarity period are set to appropriate conditions by a polarity of ionic impurities which is focused in view of countermeasures. For example, when the ionic impurities focused in view of countermeasures are anions having a negative polarity, for the lengths t1 and t2, the length t1 of the positive polarity period is longer than the length t2 of the negative polarity period, as illustrated in FIG. 7 and the following formula.

$t1 > t2$

For example, when a cycle of the AC signal Vt is 120 sec., the lengths t1 and t2 are expressed by the following formula.

$60 \text{ sec.} < t1 < 120 \text{ sec.}$ $t2 = 120 \text{ sec.} - t1$

More desirably, when the cycle of the AC signal Vt is 120 sec., the lengths t1 and t2 may be set to satisfy the following equation.

$60 \text{ sec.} < t1 \leq 90 \text{ sec.}$ $t2 = 120 \text{ sec.} - t1$

In particular, a ratio of the length t1 of the positive polarity period to the length t2 of the negative polarity period may be 3:1, or about 3:1.

Additionally, in the AC signal Vt, a maximum potential difference from the common potential Vcom may be ±1 V to ±3 V. When the maximum potential difference between the AC signal Vt and the common potential Vcom is less than ±1 V, force at which the electrode 130 draws the ionic impurities tends to decrease. In contrast, when the maximum potential difference between the AC signal Vt and the common potential Vcom exceeds ±3 V, a DC voltage is applied to the liquid crystal layer 50 for a relatively long period of time, as a result, deterioration of the liquid crystal molecules, generation of bubbles in the liquid crystal layer 50, or the like, may be caused. In the present exemplary embodiment, the common potential Vcom is, for example, 0 V, and the AC signal Vt is a pulse signal having the maximum potential difference of ±1 V to ±3 V from the common potential Vcom. Note that, the AC signal Vt may be a sine wave signal having the maximum potential difference of ±1 V to ±3 V from the common potential Vcom. Furthermore, the AC signal Vt may have a waveform in which a potential change to a high potential side and a potential change to a low potential side are different when the common potential Vcom is referenced. For example, the AC signal Vt may have a waveform in which a potential change to the high potential side is greater than a potential change to the low potential side when the common potential Vcom is referenced.

In the liquid crystal device 110 configured in this manner, when the AC signal Vt is supplied to the electrode 130 during display driving of the liquid crystal device 110, during the positive polarity period in which potential of the electrode 130 becomes higher than the common potential Vcom, as a result of being drawn by the electrode 130, the anionic impurities entering the liquid crystal layer 50 of the pixel area E are swept to the peripheral area F from the pixel area E.

Next, during the negative polarity period in which the potential of the electrode 130 becomes lower than the common potential Vcom, the anionic impurities drawn by the electrode 130 are released from the electrode 130. At this time, the cationic impurities entering the liquid crystal layer 50 of the pixel area E are swept from the pixel area E to the peripheral area F as a result of being suctioned by the electrode 130.

Next, in the positive polarity period where the potential of the electrode 130 becomes higher than the common potential Vcom, the anionic impurities are suctioned by the electrode 130. During that time, the cationic impurities suctioned by the electrodes 130 are released from the electrodes 130.

After that, the negative polarity period and the positive polarity period are alternately repeated. Therefore, in the positive polarity period, the anionic impurities are suctioned by the electrode 130, and thus the anionic impurities are swept from the pixel area E to the peripheral area F. Also, in the negative polarity period, the cationic impurities are suctioned by the electrode 130, and thus the cationic impurities are swept from the pixel area E to the peripheral area F. In the present exemplary embodiment, when focusing on entrance of ionic impurities from the seal material 40 to the liquid crystal layer 50, the length t1 of the positive polarity period is set to be longer than the length t2 of the negative polarity period, since there are more anionic impurities than cationic impurities. Accordingly, the anionic impurities can be efficiently drawn from the pixel area E into the peripheral area F.

Further, the AC signal Vt is applied to the electrode 130. Therefore, since the potential of the electrode 130 is not fixed to the positive polarity, the anionic impurities do not continue to adsorb to the electrode 130. Furthermore, since the potential of the electrode 130 is not fixed to the negative polarity, the cationic impurities do not continue to adsorb to the electrode 130. Therefore, at a surface of the electrode 130, an ionic layer due to adsorption of the anionic impurities, or an ionic layer due to adsorption of the cationic impurities is unlikely to be formed, and thus a situation is unlikely to occur in which the potential applied to the electrode 130 is shielded by an ionic layer. Therefore, a sufficient number of ionic impurities can be retained near the electrode 130. Thus, a situation is unlikely to occur in which anionic impurities and the like are unevenly distributed at the corners Ea and Eb of the pixel area E, and thus defects such as display irregularity, and a ghosting phenomenon due to energization are unlikely to occur.

Furthermore, in the present exemplary embodiment, the second pixel electrode 152 located at a boundary with the peripheral area F of the pixel area E is applied with potential that is the same as the common potential Vcom, or potential substantially the same as the common potential Vcom. Therefore, in the positive polarity period, the potential of the electrode 130 is positive with respect to the potential of the second pixel electrode 152, and in the negative polarity period, the potential of the electrode 130 is negative with respect to the potential of the second pixel electrode 152. Thus, by a lateral electric field generated between the electrode 130 and the second pixel electrode 152, ionic impurities can be efficiently swept from the pixel area E to the peripheral area F. Note that, the electrode 130 may be driven, not only during driving of the liquid crystal device 110, but also during a period during which display in the liquid crystal device 110 is stopped, as long as the common electrode 23 and the second pixel electrode 152 are energized.

1-7. Another Aspect of AC Signal Vt

In the above-described exemplary embodiment, the countermeasures to the anionic impurities have been focused, but the length t2 of the negative polarity period is set to be longer than the length t1 of the positive polarity period, as expressed by the following formula, when countermeasures to cationic impurities are focused.

$t2>t1$

For example, when a cycle of the AC signal Vt is 120 sec., the lengths t1 and t2 are expressed by the following formula.

60 sec.<$t2$<120 sec.

$t1$=120 sec.−$t2$

More desirably, when the cycle of the AC signal Vt is 120 sec., the lengths t1 and t2 may be set to satisfy the following equation.

60 sec.<$t2$≤90 sec.

$t1$=120 sec.−$t2$

In particular, a ratio of the length t1 of the positive polarity period to the length t2 of the negative polarity period may be 1:3, or about 1:3.

1-8. Relationship with Polarity Inversion Drive in First Pixel Electrode 151

When DC potential is applied to the liquid crystal layer 50, the liquid crystal layer 50 deteriorates, and a defect such as ghosting may occur in a display image in some cases. In order to prevent occurrence of such a defect, when driving is performed in which a polarity of potential of the image signals D1 to Dn applied to the first pixel electrode 151 is inverted with the common electrode 23 referenced, the cycle of the AC signal Vt applied to the electrode 130 is set to be longer than a polarity inversion cycle of the image signals D1 to Dn.

1-9. Another Aspect of Electrode 130

Figure 8:
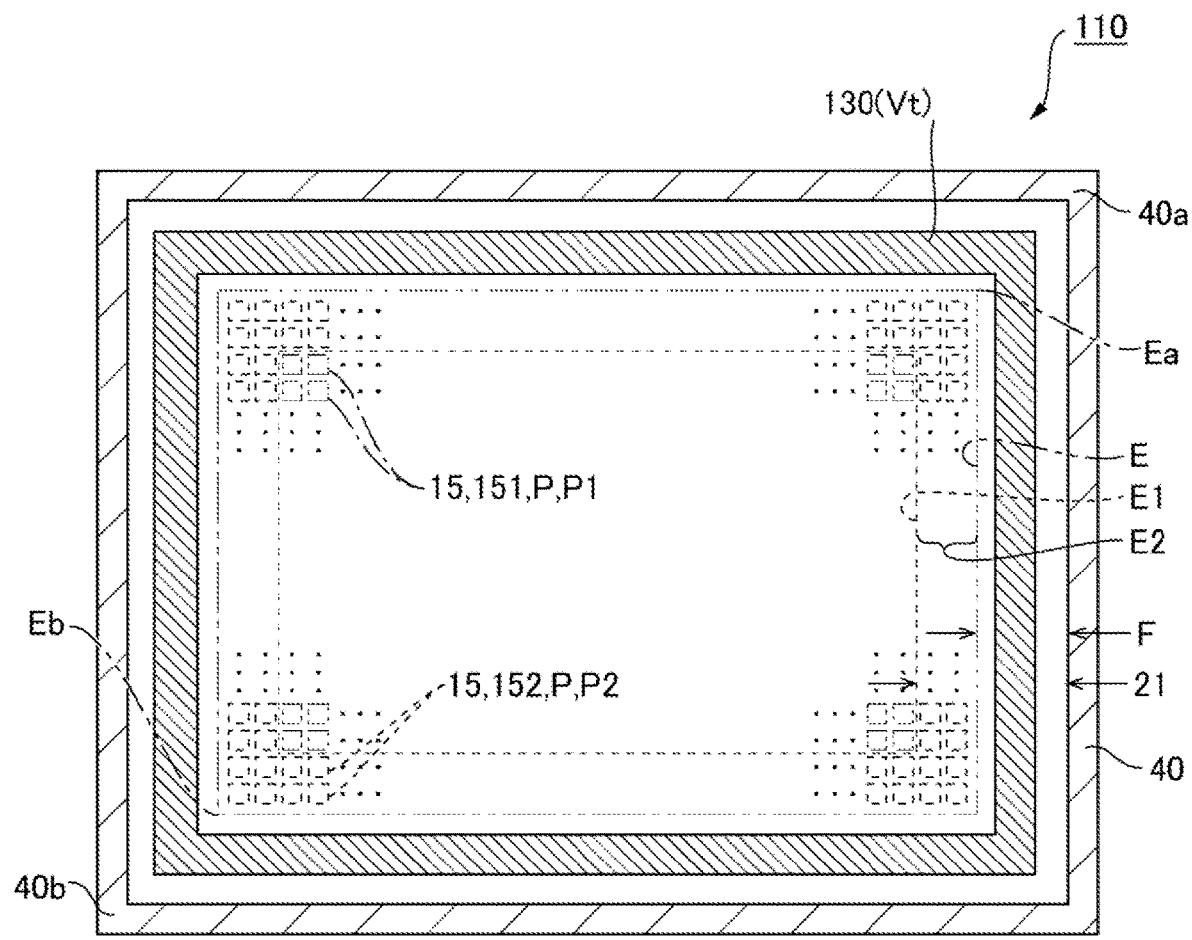
FIG. 8 is an explanatory diagram of another aspect of an electrode illustrated in FIG. 5.

FIG. 8 is an explanatory diagram of another aspect of the electrode 130 illustrated in FIG. 5. In the aspect illustrated in FIG. 5, the electrodes 130 are provided between the two corners Ea and Eb in the diagonal direction of the pixel area E, and the two corners 40*a* and 40*b* in the diagonal direction of the seal material 40, respectively, but an aspect may be adopted in which the electrodes 130 extend along the pixel area E from the two corners Ea and Eb, respectively. For example, as illustrated in FIG. 8, an aspect may be adopted in which the electrode 130 extends in a frame shape so as to surround an entire circumference of the pixel area E.

2. Second Exemplary Embodiment 2-1. Configuration of Organic Silane Compound Layers 19 and 29

Figure 9:
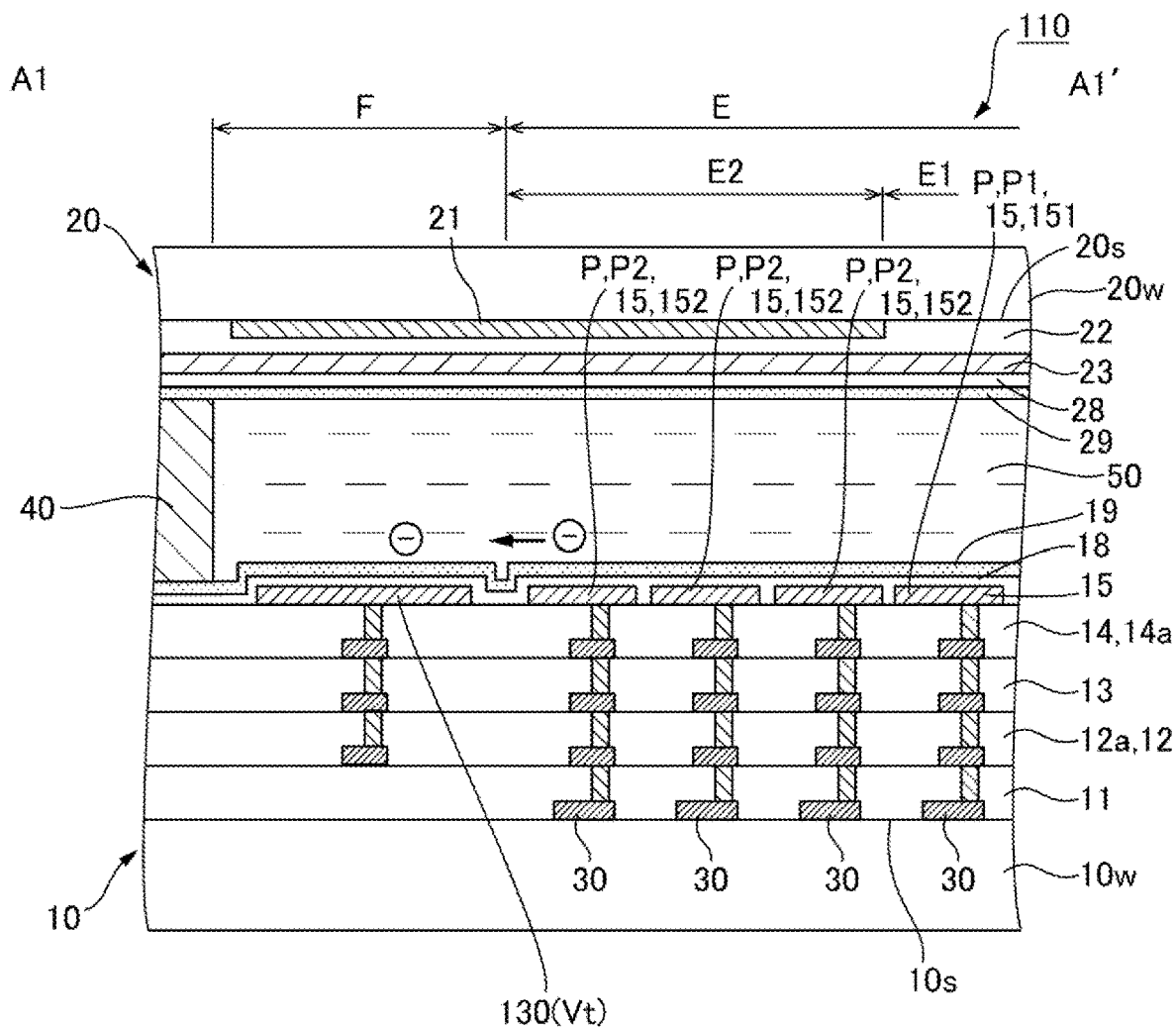
FIG. 9 is an explanatory diagram of a liquid crystal device according to a second exemplary embodiment of the present disclosure.
Figure 10:
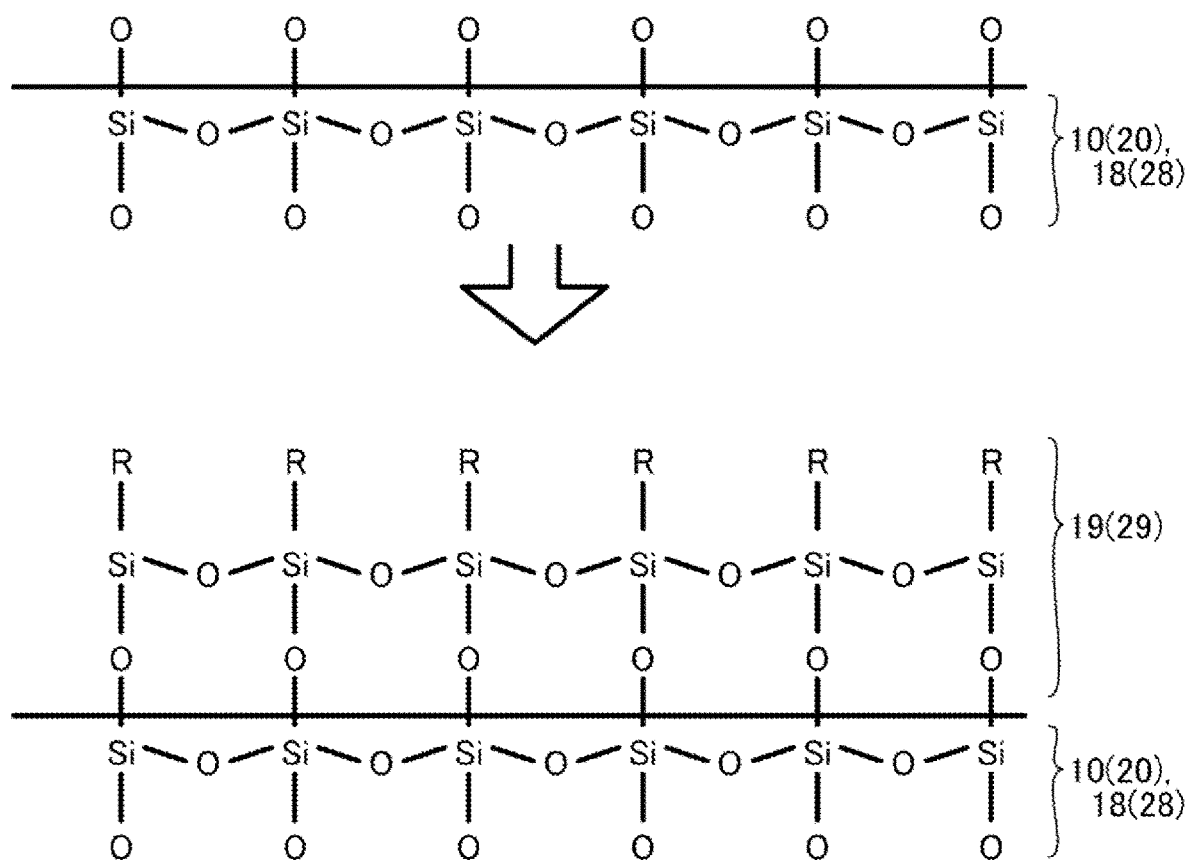
FIG. 10 is an explanatory diagram of an organic silane compound layer illustrated in FIG. 9.

FIG. 9 is an explanatory diagram of the liquid crystal device 110 according to a second exemplary embodiment of the present disclosure. FIG. 10 is an explanatory diagram of the organic silane compound layers 19 and 29 illustrated in FIG. 9.

As illustrated in FIG. 9 and FIG. 10, in the liquid crystal device 110 of the present exemplary embodiment, there is an unbonded hand (dangling bond) of an Si atom, or dimer structure (Si—Si bond) in which Si atoms are bonded together, in SiOx forming the first alignment film 18 and the second alignment film 28, and the unbonded hand of such an Si atom is likely to be terminated by a silanol group (—Si—OH) by a reaction with moisture in an atmosphere or moisture in the liquid crystal layer 50. Here, the silanol group is highly reactive. In particular, a projection-type display device 100 described below, is irradiated with strong light source light, and thus a photochemical reaction is likely to occur between the silanol groups of the first alignment film 18 and the second alignment film 28, and a liquid crystal material. Therefore, in the present exemplary embodiment, the organic silane compound layers 19 and 29 made of organopolysiloxane or the like are bonded to hydroxyl group (—OH) portions by a silane coupling agent such as an organic siloxane, at surfaces of the first alignment film 18 and the second alignment film 28, respectively.

More specifically, after producing silanol (Si—OH) by hydrolysis, the silane coupling agent produces siloxane bonds (Si—O—Si) by gradually condensing silanol, to form the organic silane compound layers 19 and 29. Further, the silane coupling agent also reacts with an inorganic oxide surface by a similar mechanism to produce strong covalent bonding with the inorganic oxide surface. Therefore, contact between the silanol groups of the first alignment film 18 and the second oriented film 28, and liquid crystal material of the liquid crystal layer 50 is suppressed. Therefore, a photochemical reaction is unlikely to occur between the silanol groups of the first alignment film 18 and the second alignment film 28, and the liquid crystal material. Here, respective thicknesses of the organic silane compound layers 19 and 29 are extremely thin, with respect to respective heights of the columns 18*a* and 28*a* that form the first alignment film 18 and the second oriented film 28, respectively. For example, the respective heights of the columns 18*a* and 28*a* that form the first alignment film 18 and the second alignment film 28, respectively, are usually tens of nanometers, whereas the respective thicknesses of the organic silane compound layers 19 and 29 are usually several nm. Thus, the organic silane compound layers 19 and 29 are less likely to affect alignment regulating force of the first alignment film 18 and the second alignment film 28, respectively.

Examples of the silane coupling agent include n-hexyltrimethoxysilane, n-hexyl triethoxysilane, cyclohexylmethyl dimethoxysilane, n-octyltriethoxysilane, n-decyltrimethoxysilane, and the like. In the present exemplary embodiment, n-decyltrimethoxysilane is used as the silane coupling agent, and n-decyltrimethoxysilane has an n-decyl group as a hydrophobic functional group. Also, the silane coupling agent may have fluorine atoms.

Of these silane coupling agents, for example, when a trimethoxysilane-based silane compound is used, the trimethoxysilane-based silane compound is individually bonded to each of 30% or more of the silanol groups present per unit area of a surface without bonding to each other. Here, a molecular size of the trimethoxysilane-based silane compound bonded to the silanol group is larger than an interval between the silanol groups present on the respective surfaces of the first alignment film 18 and the second alignment film 28. Therefore, even without bonding the silane compounds to substantially all of the silanol groups present at the respective surface of the first alignment film 18 and the second oriented film 28, a terminal group of the silane compound bonded to the silanol group causes a steric hindrance to occur in a silanol group to which a silane compound is not bonded, and between liquid crystal molecules. In this case, a terminal group R mainly contributes to the occurrence of steric hindrance, and the silane compound bonded to the silanol group can suppress bonding of the silanol group to which the silane compound is not bonded and liquid crystal molecules by a photochemical reaction when the liquid crystal device 110 is operating, and light resistance can be enhanced.

Furthermore, since the organic silane compound layers 19 and 29 are hydrophobic, a contact angle with water is large. Therefore, the organic silane compound layers 19 and 29 have low ion adsorption properties. Thus, the organic silane compound layers 19 and 29 can suppress adsorption of ionic impurities in the first alignment film 18 and the second alignment film 28, respectively. Therefore, ionic impurities included in the liquid crystal layer 50 in the pixel area E are easily drawn by the electrodes 130. In addition, in the first alignment film 18 covering the electrode 130, ion adsorption properties are reduced by the organic silane compound layer 19, thus a situation is unlikely to occur in which ionic impurities drawn by the electrode 130 adsorb to the first alignment film 18 to form an ionic layer. Accordingly, a situation is unlikely to occur in which potential applied to the electrode 130 is shielded by an ionic layer, and thus the electrode 130 is likely to draw ionic impurities included in the liquid crystal layer 50 of the pixel area E.

2-2. Another Aspect of Organic Silane Compound Layer 29

Figure 11:
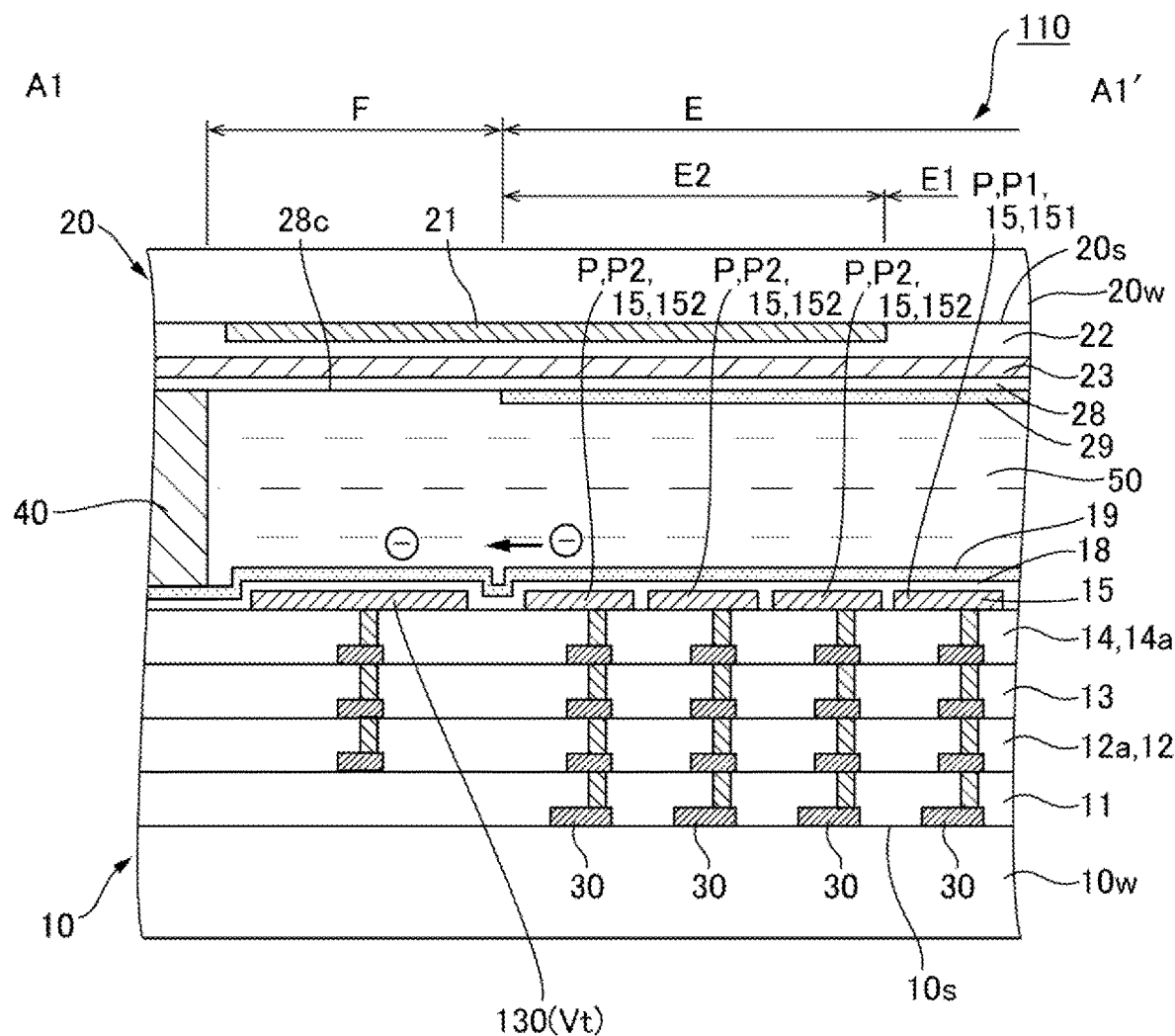
FIG. 11 is an explanatory diagram of another aspect of the organic silane compound layer illustrated in FIG. 9.

FIG. 11 is an explanatory diagram of another aspect of the organic silane compound layer 29 illustrated in FIG. 9. In the exemplary embodiment illustrated in FIG. 9, the area facing the electrode 130 in the second alignment film 28 is covered with the organic silane compound layer 29, but in the present exemplary embodiment, the organic silane compound layer 29 is not formed in an area facing the electrode 130 in the second alignment film 28, as illustrated in FIG. 11. Thus, the area facing the electrode 130 in the second alignment film 28 is an exposed portion 28c from the organic silane compound layer 29, and the exposed portion 28c is highly hydrophilic, and ionic impurities are easily adsorbed.

Therefore, even when anionic impurities are released from the electrode 130 when potential with respect to the electrode 130 is in a positive polarity period, a state occurs where the anionic impurities are adsorbed to the exposed portion 28c, so even when there is a concentration gradient of the anionic impurities, the anionic impurities are unlikely to diffuse in the pixel area E. Additionally, even when cationic impurities are released from the electrode 130 when potential with respect to the electrode 130 is in a negative polarity period, a state occurs where the cationic impurities are adsorbed to the exposed portion 28c, so even when there is a concentration gradient of the cationic impurities, the cationic impurities are unlikely to diffuse in the pixel area E.

Note that, the exposed portion 28c can be formed by forming the organic silane compound layer 29 at an entire surface of the second alignment film 28, and then irradiating with an excimer laser or the like to remove the organic silane compound layer 29.

3. Third Exemplary Embodiment

Figure 12:
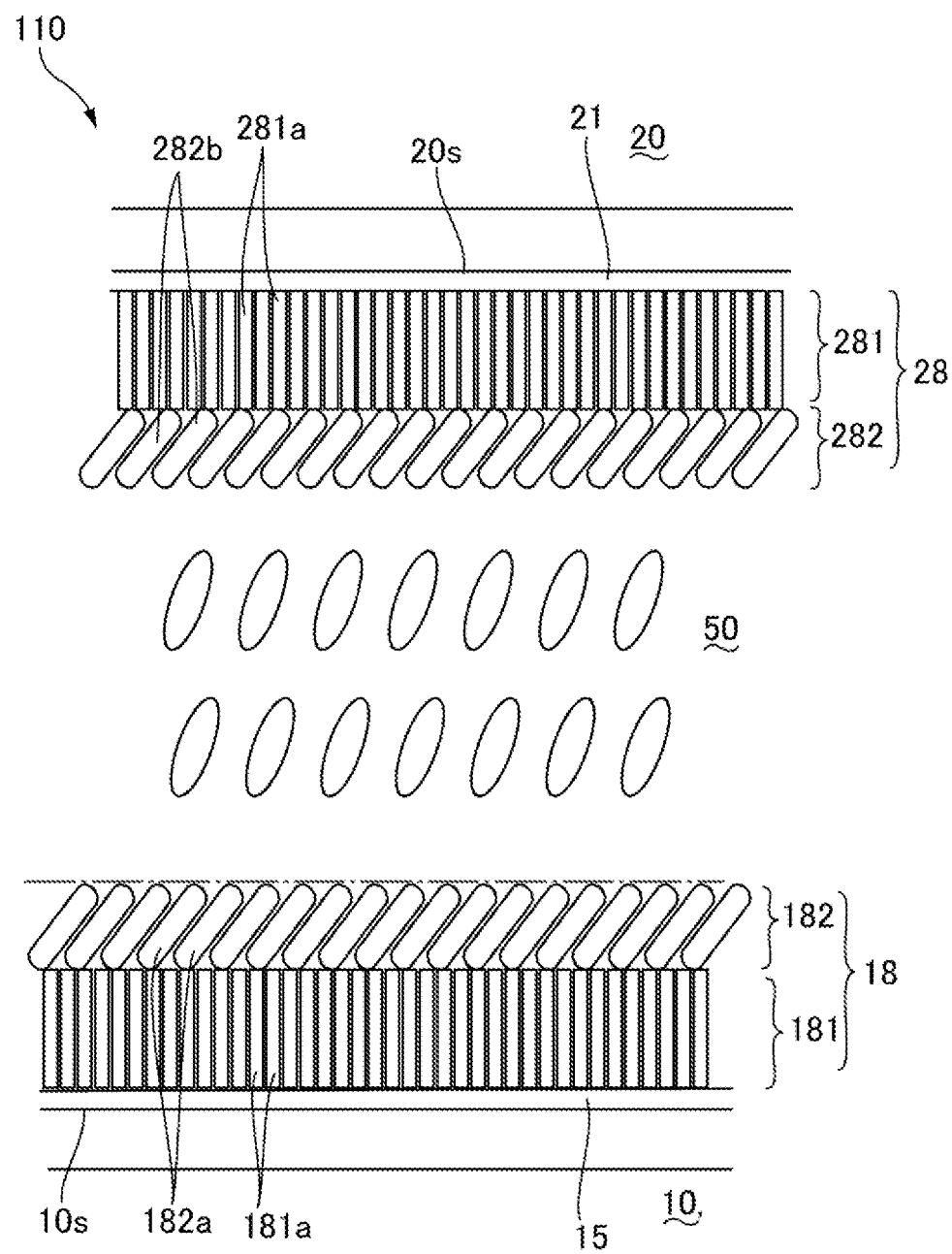
FIG. 12 is an explanatory diagram illustrating another aspect of a first alignment film and a second alignment film illustrated in FIG. 2.

FIG. 12 is an explanatory diagram illustrating another aspect of the first alignment film 18 and the second alignment film 28 illustrated in FIG. 2. In the first exemplary embodiment and the second exemplary embodiment, the entire first alignment film 18 and second alignment film 28 are formed by diagonally vapor-deposited films. On the other hand, in the present exemplary embodiment, as illustrated in FIG. 12, the first alignment film 18 includes first inorganic films 181 in which a long axis direction of columns 181a is orthogonal to a substrate surface, and second inorganic film 182 covering the first inorganic film 181, the second alignment film 28 includes first inorganic films 281 in which a long axis direction of columns 281a is orthogonal to the substrate surface, and second inorganic film 282 covering the first inorganic film 281, and in the second inorganic films 182 and 282, long axis directions of the respective columns 182a and 282a are diagonally inclined in directions indicated by the respective arrows C1 and C2 in FIG. 1, with respect to the substrate surface.

Here, the first inorganic films 181 and 281 are vertical vapor deposition films deposited from a direction perpendicular to the substrate surface. The second inorganic film 182 and 282 are diagonally vapor-deposited films deposited from a direction inclined diagonally with respect to the substrate surface. The second inorganic films 182 and 282 are columnar crystals of silicon oxide. In the present exemplary embodiment, the second inorganic films 182 and 282 have less film thicknesses than the first inorganic films 181 and 281, respectively.

In the first alignment film 18 and the second alignment film 28 configured as described above, the first inorganic films 181 and 281 are vertical vapor deposition films, and thus less likely to be affected by a surface condition of the pixel electrode 15. Accordingly, defects are less likely to occur in the first inorganic films 181 and 281. Thus, surface roughness of the second inorganic films 182 and 282 forming surfaces in the first alignment film 18 and the second alignment film 28 respectively is small, and thus liquid crystal molecules can be appropriately aligned.

4. Other Exemplary Embodiments

The liquid crystal device 110 to which the present disclosure is applied is not limited to a liquid crystal device in a VA mode. For example, the present disclosure may be applied when the liquid crystal device 110 is a liquid crystal device in a TN (Twisted Nematic) mode or an OCB (Optical Compensated Bend) mode. In addition, the present disclosure may be applied not only to the transmissive type liquid crystal device 110, but also to a reflective type liquid crystal device.

5. Example of Mounting onto Projection-Type Display Device 100

Figure 13:
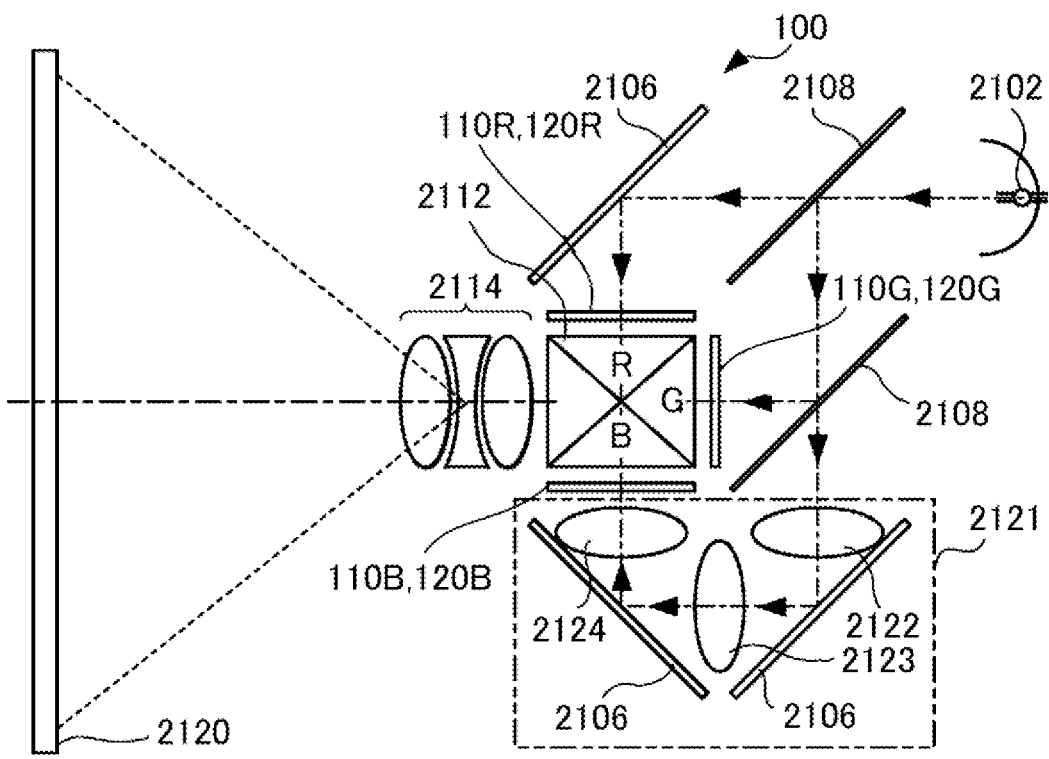
FIG. 13 is a schematic configuration diagram of a projection-type display device using a liquid crystal device to which the present disclosure is applied.

An electronic apparatus using the liquid crystal device 110 according to the above-described exemplary embodiments will be described. FIG. 13 is a schematic configuration diagram of the projection-type display device 100 using the liquid crystal device 110 to which the present disclosure is applied. In FIG. 13, an optical element such as a polarizing plate is not illustrated. The projection-type display device 100 illustrated in FIG. 13 is an example of an electronic apparatus using the liquid crystal device 110.

In the projection-type display device 100 illustrated in FIG. 13, light valves 120 each including the liquid crystal device 110 according to the above-described embodiment are provided corresponding to a R (red) color, a G (green) color, a B (blue) color. Therefore, the display device 100 includes a first liquid crystal device 110B on which light in a first wavelength range is incident, a second liquid crystal device 110G on which light in a second wavelength range having a longer wavelength than that of the first wavelength range is incident, and a third liquid crystal device 110R on which light in a third wavelength range having a longer wavelength than that of the second wavelength range is incident.

The projection-type display device 100 is provided with a lamp unit 2102 having a white light source such as a halogen lamp as a light source unit. Projection light emitted from the lamp unit 2102 is split into three primary colors of the R color, the G color, and the B color by three mirrors 2106 and two dichroic mirrors 2108 installed inside. The split projection light is guided to each of light valves 120R, 120G, and 120B corresponding to the primary colors, and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 120R, 120G, and 120B is incident on a synthetic optical system including a dichroic prism 2112 from three directions. Then, at the synthetic optical system 2112, the light of the R color and the light of the B color are reflected at 90 degrees, and the light of the G color is transmitted. Accordingly, images of the respective primary colors are synthesized in the synthetic optical system 2112, and subsequently a color image is projected on a projected member such as a screen 2120, by a projection optical system 2114.

In the projection-type display device 100 configured in this manner, for example, the liquid crystal device 110 according to any of the first exemplary embodiment to the third exemplary embodiment is used in the first liquid crystal device 110B, the second liquid crystal device 110G, and the third liquid crystal device 110R.

In addition, in the projection-type display device 100, the liquid crystal device 110 according to any of the first exemplary embodiment to the third exemplary embodiment may be used in the first liquid crystal device 110B on which light having a shortest wavelength is incident, and a liquid crystal device in which an electrode according to the present disclosure is not provided may be used in the second liquid crystal device 110G and the third liquid crystal device 110R.

In addition, in the projection-type display device 100, the liquid crystal device 110 according to any of the first exemplary embodiment to the third exemplary embodiment may be used in the first liquid crystal device 110B and the second liquid crystal device 110G on which light having a relatively short wavelength is incident, and a liquid crystal device in which an electrode according to the present disclosure is not provided may be used in the third liquid crystal device 110R.

In addition, in the projection-type display device 100, the liquid crystal device 110 according to the second exemplary embodiment or the third exemplary embodiment may be used in the first liquid crystal device 110B on which light having a shortest wavelength is incident, and the liquid crystal device 110 according to the first exemplary embodiment may be used in the second liquid crystal device 110G and the third liquid crystal device 110R.

In addition, in the projection-type display device 100, the liquid crystal device 110 according to the second exemplary embodiment or the third exemplary embodiment may be used in the first liquid crystal device 110B and the second liquid crystal device 110G on which light having a relatively short wavelength is incident, and the liquid crystal device 110 according to the first exemplary embodiment may be used in the third liquid crystal device 110R.

6. Other Electronic Apparatuses

The projection-type display device 100 illustrated in FIG. 13 may be configured to use, as a light source unit, an LED light source configured to emit light in various colors, and the like to supply light in various colors emitted from the LED light source to another liquid crystal device. The liquid crystal device 110 to which the present disclosure is applied may be used in the projection-type display device 100 using a laser light source for a light source unit.

Further, an electronic apparatus including the liquid crystal device 110 to which the present disclosure is applied is not limited to the projection-type display device 100 of the above-described exemplary embodiments. For example, the liquid crystal device 110 to which the present disclosure is applied may be used in electronic apparatuses such as a projection-type head up display (HUD), a direct-view-type head mounted display (HMD), a personal computer, a digital still camera, and a liquid crystal television.

What is claimed is:
1. A liquid crystal device, comprising:
a first substrate having a pixel electrode in a pixel area;
a second substrate having a common electrode to which a common potential is applied;
a seal material provided between the first substrate and the second substrate; and
a liquid crystal layer disposed in a space surrounded by the seal material, wherein
the first substrate has an electrode between the pixel area and the seal material in plan view, and
the electrode is applied with an AC signal having a length of a positive polarity period in which a polarity of the AC signal is positive with respect to the common potential and a length of a negative polarity period in which the polarity is negative with respect to the common potential, the length of the positive polarity period and the length of the negative polarity period being different, wherein
a maximum potential difference in the AC signal from the common potential is equal to or greater than 1 V and less than 3 V.

2. The liquid crystal device according to claim 1, wherein a ratio of the length of the positive polarity period and the length of the negative polarity period is 1:3 or 3:1.

3. The liquid crystal device according to claim 1, wherein the length of the positive polarity period is greater than the length of the negative polarity period.

4. The liquid crystal device according to claim 1, wherein an image signal applied to the pixel electrode is subjected to a polarity inversion in which a potential with respect to the common potential as a reference potential is alternately switched between a positive polarity and a negative polarity, and a cycle of the AC signal is longer than a cycle of the polarity inversion.

5. The liquid crystal device according to claim 1, wherein at least one of the pixel electrode and the common electrode is covered with an inorganic alignment film including, at a surface thereof, an organic silane compound layer.

6. The liquid crystal device according to claim 5, wherein the inorganic alignment film includes a first inorganic film having a column along a normal line direction of the first substrate, and a second inorganic film that covers the first inorganic film, and has a column inclined diagonally with respect to the normal line direction of the first substrate.

7. An electronic apparatus, comprising:
a first liquid crystal device on which light in a first wavelength range is incident;
a second liquid crystal device on which light in a second wavelength range having a longer wavelength than that of the first wavelength range is incident; and
a third liquid crystal device on which light in a third wavelength range having a longer wavelength than that of the second wavelength range is incident; and
a synthetic optical system configured to synthesize light in the first wavelength range emitted from the first liquid crystal device, light in the second wavelength range emitted from the second liquid crystal device, and light in the third wavelength range emitted from the third liquid crystal device, wherein
the liquid crystal device according to claim 1 is used for the first liquid crystal device.

8. An electronic apparatus, comprising:
a first liquid crystal device on which light in a first wavelength range is incident;
a second liquid crystal device on which light in a second wavelength range having a longer wavelength than that of the first wavelength range is incident; and
a third liquid crystal device on which light in a third wavelength range having a longer wavelength than that of the second wavelength range is incident; and
a synthetic optical system configured to synthesize light in the first wavelength range emitted from the first liquid crystal device, light in the second wavelength range emitted from the second liquid crystal device, and light in the third wavelength range emitted from the third liquid crystal device, wherein
the liquid crystal device according to claim 1 is used for each of the first liquid crystal device and the second liquid crystal device.

\* \* \* \* \*